US009555786B2

(12) United States Patent
Feigel (10) Patent No.: US 9,555,786 B2
(45) Date of Patent: Jan. 31, 2017

(54) BRAKING SYSTEM FOR MOTOR VEHICLES AND METHOD FOR THE OPERATION OF A BRAKING SYSTEM

(71) Applicant: Continental Automotive GmbH, Hannover (DE)

(72) Inventor: Hans-Jörg Feigel, Rosbach (DE)

(73) Assignee: CONTINENTAL TEVES AG & CO. OHG, Frankfurt (DE)

( * ) Notice: Subject to any disclaimer, the term of this patent is extended or adjusted under 35 U.S.C. 154(b) by 0 days.

(21) Appl. No.: 14/424,094

(22) PCT Filed: Jul. 11, 2013

(86) PCT No.: PCT/EP2013/064689
§ 371 (c)(1),
(2) Date: Feb. 26, 2015

(87) PCT Pub. No.: WO2014/037135
PCT Pub. Date: Mar. 13, 2014

(65) Prior Publication Data
US 2015/0224972 A1    Aug. 13, 2015

(30) Foreign Application Priority Data

Sep. 4, 2012    (DE) .......................... 10 2012 215 627

(51) Int. Cl.
*B60T 11/26*    (2006.01)
*B60T 7/04*    (2006.01)
(Continued)

(52) U.S. Cl.
CPC .............. *B60T 11/103* (2013.01); *B60T 7/042* (2013.01); *B60T 8/4081* (2013.01); *B60T 11/16* (2013.01); *B60T 11/26* (2013.01)

(58) Field of Classification Search
CPC ........ B60T 8/34; B60T 8/4081; B60T 8/4077; B60T 8/4872; B60T 8/4275; B60T 8/4881; B60T 8/4854; B60T 8/4836; B60T 8/4827; B60T 8/409; B60T 8/4072; B60T 7/06; B60T 7/042; B60T 11/28; B60T 11/103; B60T 11/26; B60T 11/203; B60T 11/224; B60T 13/62; B60T 13/662; B60T 13/58; B60T 13/147; B60T 13/686; B60T 13/745; B60T 13/74; B60T 13/72; B60T 15/028; B60T 17/00
(Continued)

(56) References Cited

U.S. PATENT DOCUMENTS 4,730,877 A * 3/1988 Seibert .................... B60T 7/042
                                                                                   188/358
5,613,740 A    3/1997 Kawamoto et al.
(Continued)

FOREIGN PATENT DOCUMENTS

DE    10 2007 059 901 A1    6/2009
DE    10 2011 083 237 A1    4/2012
(Continued)

OTHER PUBLICATIONS

PCT International Search Report—Aug. 28, 2013.

*Primary Examiner* — Robert A Siconolfi
*Assistant Examiner* — San Aung
(74) *Attorney, Agent, or Firm* — Brinks Gilson & Lione (57) ABSTRACT

A motor vehicle braking system and method operable in a brake-by-wire mode and independently of the driver, with a master brake cylinder (2) operated by a brake pedal (1) having a piston (15, 16) and a pressure chamber (17, 18), connected with a brake circuit (I, II) and wheel brakes (8,9, 10, 11). An electrically controllable pressure supplying device (5) operates the wheel brakes; and a simulation device (3) with at least one elastic element (33), provides an acceptable brake pedal feel in the brake-by-wire mode. The simulation device (3) has a simulator chamber (29) con-
(Continued)

nected, or is hydraulically connected, through a first hydraulic connection (54) to the pressure chamber (17) and which has an electrically actuated isolation valve (28) with a pressure means reservoir (4) under atmospheric pressure. A media separator device (47) is arranged in the connection (46) between the simulator chamber (29) and the isolation valve (28).

21 Claims, 3 Drawing Sheets

(51) Int. Cl.
*B60T 11/10* (2006.01)
*B60T 8/40* (2006.01)
*B60T 11/16* (2006.01)

(58) Field of Classification Search
USPC ........ 303/15, 9.75, 6.01, 3, 20, 113.3, 113.2
See application file for complete search history.

(56) References Cited

U.S. PATENT DOCUMENTS

| | | | |
|---|---|---|---|
| 6,247,762 B1* | 6/2001 | Kusano | B60T 7/042 303/3 |
| 2002/0011750 A1 | 1/2002 | Higashimura et al. | |
| 2004/0061375 A1 | 4/2004 | Drott et al. | |
| 2008/0236971 A1* | 10/2008 | Suzuki | B60T 8/3655 188/358 |
| 2008/0257670 A1* | 10/2008 | Drumm | B60T 8/4077 188/358 |
| 2011/0115282 A1* | 5/2011 | Dinkel | B60T 7/042 303/3 |
| 2012/0169112 A1* | 7/2012 | Jungbecker | B60T 8/4081 303/9.75 |

FOREIGN PATENT DOCUMENTS

| | | |
|---|---|---|
| EP | 0 321 700 | 11/1988 |
| WO | WO 2011/029812 A1 | 3/2011 |

* cited by examiner

BRAKING SYSTEM FOR MOTOR VEHICLES AND METHOD FOR THE OPERATION OF A BRAKING SYSTEM

CROSS REFERENCE TO RELATED APPLICATIONS

This application claims priority to German Patent Application No. 10 2012 215 627.5, filed on Sep. 4, 2012; and PCT/EP2013/064689, filed Jul. 11, 2013.

FIELD OF THE INVENTION

The invention relates to a braking system for motor vehicles to a method for the operation of a braking system

BACKGROUND

Hydraulic vehicle braking systems which are designed as power-operated braking systems and, in addition to a muscle-powered brake master cylinder, to which wheel brakes are hydraulically connected and which supplies pressure and volume for the actuation of wheel brakes, may include a further, electrically controllable pressure and volume supplying device, which controls the wheel brakes in a "brake by wire" operating mode, are known. In such a system, if the electrically controllable pressure and volume supplying device fails, the wheel brakes are actuated exclusively by the muscle power of the vehicle driver (unassisted fallback operating mode).

WO 2011/029812 A1 discloses an electrohydraulic braking system having a brake-pedal-actuated brake master cylinder, a travel simulator and a pressure supplying device. In a "brake by wire" operating mode, the wheel brakes are supplied with pressure by the pressure supplying device. In the fallback operating mode, the wheel brakes are supplied by means of the brake-pedal-actuated brake master cylinder with the pressure applied by the driver.

DE 10 2011 083 237 A1 discloses a braking system of the type described above. The braking system includes a hydraulic actuating device which can be actuated by means of a brake pedal and to which wheel brakes are connected, and a hydraulic travel simulator having a hydraulic chamber. The actuating device is hydraulically connected to the travel simulator via a hydraulic connection, wherein the hydraulic connection is hydraulically connected to a pressure medium reservoir by means of a normally open isolation valve. To modify the force/displacement characteristic curve of the brake pedal actuation, i.e. to modify the brake pedal feel perceived by the vehicle driver, pressure medium is discharged into the pressure medium reservoir via the isolation valve at the beginning of the braking operation, when the brake pedal travel is less than a predetermined limiting value. As soon as the brake pedal travel is greater than the limiting value, the isolation valve is closed. In the braking system described above, the isolation valve should not remain open for too long since, otherwise, the brake pedal "sags", something that the vehicle driver will perceive as disturbing or irritating. However, activation for closure of the isolation valve is associated with the generation of noise, which can likewise be perceived as disturbing. In the case of a power failure, when the isolation valve cannot be closed, or when the isolation valve is leaky, the pressure medium volume displaced from the actuating device can escape into the pressure medium reservoir when the brake pedal is actuated in the previously known braking system, with the result that a pressure buildup in the wheel brakes is not possible or is possible only to a limited extent in the fallback operating mode, for example. This safety-critical situation should be avoided.

It is therefore an object of the present invention to provide a braking system having a variable force/displacement characteristic curve of the brake pedal actuation and a method for the operation of a braking system of this kind which ensure higher operational safety than the prior art in as economical a manner as possible. It should also be possible to operate the braking system with as little noise as possible.

According to the invention, this object is achieved by a braking system and method as described herein.

SUMMARY AND INTRODUCTORY DESCRIPTION OF THE INVENTION

The present invention is based on the concept of arranging a media separating device in the connection between the simulator chamber and the isolation valve, which media separating device divides the connection between the simulator chamber and the isolation valve on the pressure medium side, thus preventing pressure medium from being displaced to an unlimited extent to the pressure medium reservoir via the isolation valve. This ensures that there is a sufficient quantity of pressure medium available to actuate the wheel brakes, even if the isolation valve is open or leaky.

The isolation valve is preferably embodied so as to be normally open, eliminating the need for activation to close the isolation valve in order to operate the braking system and thus avoiding additional noise generation during the activation of the isolation valve.

The media separating device system preferably includes a first hydraulic chamber for receiving pressure medium, wherein the first chamber is separated from a second hydraulic chamber by means of a media separating element that can be moved or deformed to a limited extent. The second chamber is hydraulically connected to the isolation valve. This enables the pressure medium coming from the pressure chamber of the brake master cylinder to be accommodated in the first chamber. The force/displacement characteristic curve of the brake pedal actuation can thus be switched over in a simple manner during driving. However, the pressure medium volume that can be accommodated in the first chamber is limited by the media separating element and, accordingly, the pressure medium volume that can be displaced from the second chamber and moved into the pressure medium reservoir is also limited.

According to a preferred embodiment of the invention, the media separating device Is embodied as a cylinder/separating piston arrangement, wherein the media separating element is the separating piston. In this way, the media separating device system can be implemented in a simple and economical manner as a separating piston guided in a further bore in the housing of the braking system. As a particular preference, the sealing elements for hydraulically separating the first and second chambers are arranged in a manner fixed relative to the housing.

An elastic element, on which the separating piston is supported, is preferably arranged in the second chamber. When the isolation valve is open, the first chamber of the media separating device thus acts like an additional receiving volume of the simulation device, wherein the selected stiffness of the elastic element of the media separating device can be different from the stiffness of the elastic element of the simulation device, thereby making it possible to achieve a force/displacement characteristic curve with different gradients. As a particular preference, the elastic element is preloaded in order to hold the separating piston in a position adjacent to the simulation device.

It is also preferred if the media separating device includes a flexible diaphragm. Through appropriate choice of the geometry and shape of the diaphragm, any desired response behavior or pressure medium volume reception behavior of the media separating device system can thus be specified. As a particular preference, the diaphragm is designed as a media separating element, as an alternative to a separating piston. Thus, the flexible diaphragm can be arranged in a bore and can separate the first chamber from the second chamber.

According to a preferred embodiment of the invention, the isolation valve is arranged in a second hydraulic connection between the pressure chamber and the pressure medium reservoir. Thus, the isolation valve can be used not only to modify the brake pedal characteristic curve but also as a diagnostic valve. Hence, only one additional valve is required, rather than a diagnostic valve in the hydraulic connection between the pressure chamber and the pressure medium reservoir and an isolation valve in the connection between the simulator chamber and the pressure medium reservoir.

The simulator chamber is preferably in communication with the second hydraulic connection between the pressure chamber and the isolation valve.

The first hydraulic connection between the simulator chamber and the pressure chamber of the brake master cylinder is preferably embodied in such a way that it can be opened and closed by means of an electrically actuated simulator enable valve, i.e. the action of the simulation device can be switched on and off by means of the simulator enable valve. It is thereby possible completely to prevent pressure medium from flowing out of the pressure chamber into the simulator chamber and/or the media separating device system. As a particular preference, the simulator enable valve is embodied so as to be normally closed in order to ensure that pressure medium can be displaced directly into the wheel brakes from the pressure chamber in the event of a power failure. In the fallback operating mode, the simulation device is advantageously switched off.

The pressure chamber is preferably connected to the pressure medium reservoir by radial bores formed in the piston and by the second connection. As a particular preference, the connection via the radial bores is interrupted when the brake pedal is actuated.

The braking system preferably further includes an electrically actuated, in particular normally open, block valve, in particular one for each brake circuit, for separating the pressure chamber from the brake circuit.

The braking system preferably includes an electrically actuated, in particular normally closed, sequence valve, in particular one for each brake circuit, for hydraulically connecting the pressure supplying device to the brake circuit.

The braking system likewise preferably includes one electrically actuated, normally open inlet valve and one electrically actuated, normally closed outlet valve for each wheel brake for setting wheel-specific brake pressures.

The braking system preferably includes one inlet valve and one outlet valve per wheel brake for setting wheel-specific brake pressures, which are derived from brake circuit pressures assigned to the brake circuits, wherein the inlet valves transmit the brake circuit pressure to the wheel brakes in the unactivated state and limit or prevent a wheel brake pressure buildup in the activated state, and wherein the outlet valves prevent pressure medium from flowing out of the wheel brakes into a pressure medium reservoir in the unactivated state and permit and control such a flow in the activated state, wherein the inlet valves are closed, with the result that a wheel brake pressure reduction takes place.

The block valve is in each case preferably arranged in a hydraulic connecting line between the pressure chamber and the brake circuit or the brake circuit supply line and thus allows selective closure or opening of the hydraulic connection between the pressure chamber and the brake circuit. As a particular preference, the block valves are embodied so as to be normally open to ensure that the brake circuits are connected hydraulically to the brake master cylinder in a deenergized fallback operating mode and can thus be supplied with pressure by the vehicle driver.

The sequence valve is in each case preferably arranged in a hydraulic connecting line between the pressure supplying device and the brake circuit or the brake circuit supply line and thus allows selective closure or opening of the hydraulic connection between the pressure supplying device and the brake circuit. As a particular preference, the sequence valves are embodied so as to be normally closed to ensure that the brake circuit is hydraulically separated from the first pressure supplying device in a deenergized fallback operating mode.

The electrically controllable pressure supplying device is preferably formed by a cylinder/piston arrangement, the piston of which can be actuated by an electromechanical actuator. An electrohydraulic actuator of this kind operates in a particularly dynamic way and very quietly, and has no problem in managing the number of load cycles required for braking systems.

The braking system furthermore preferably includes at least one pressure sensor for detecting a pressure of the brake master cylinder and one pressure sensor for detecting the pressure of the pressure supplying device. Moreover, it is advantageous if the braking system has a displacement or angle sensor for detecting a location or position of the pressure supplying device and a displacement or angle sensor for detecting a brake pedal actuation. The signals from the four sensors mentioned are preferably processed by the electronic open-loop and closed-loop control unit.

The invention also relates to a method for the operation of a braking system. With this method, the quantity of pressure medium displaced into the pressure medium reservoir is limited to a predetermined maximum quantity by a medium separating device system arranged between the simulator chamber and the isolation valve, even when the isolation valve is open.

Preferably, when a predetermined condition is present, the isolation valve is not closed during the entire braking operation when the brake pedal is actuated. In this way, switching noises from the isolation valve are avoided. It is only possible to dispense with closure of the isolation valve because the quantity of pressure medium displaced into the pressure medium reservoir is limited, even when the isolation valve is open. As a particular preference, the isolation valve is not closed when a first option has been chosen by the vehicle driver via an HMI interface. It is advantageous if the first option corresponds to a setting of the braking system ("comfort setting") in which the force/displacement characteristic curve has a gentle slope in the case of small brake pedal travels.

When a predetermined condition is present, the isolation valve is preferably immediately closed when the brake pedal is actuated, and, as a particular preference, remains closed during the entire braking operation. In this way, pressure medium is prevented from being held in the media separating device, and the pressure medium is received by the simulation device. The brake pedal feel is thus determined by the elastic element of the simulation device. As a particular preference, the isolation valve is immediately closed when a second option has been chosen by the vehicle driver via an HMI interface. It is advantageous if the second option corresponds to a setting of the braking system ("sport setting") with a more steeply rising slope of the force/displacement characteristic curve in the case of small brake pedal travels than with the comfort setting. The second option thus leads to a shortening of the brake pedal travel on the same applied brake pedal actuating force. According to a preferred embodiment of the invention, when the brake pedal is actuated, the isolation valve is closed to shorten the brake pedal travel, preferably in accordance with a choice of the vehicle driver via an HMI interface and/or in accordance with a variable relating to driving dynamics and/or in accordance with a signal from an open-loop and/or closed-loop control unit in the motor vehicle. As a particular preference, the vehicle speed and/or the speed of brake pedal actuation is taken into account as the variable relating to driving dynamics. It is likewise particularly preferred that the open-loop and/or closed-loop control unit in the motor vehicle should be an open-loop and/or closed-loop control unit in which hazard detection is performed. In the case of high vehicle speeds and/or high speeds of brake pedal actuation (emergency braking) and/or a detected hazard (e.g. a pedestrian on the roadway), for example, the isolation valve is advantageously closed so that the vehicle driver has only to perform a minimum brake pedal travel.

BRIEF DESCRIPTION OF THE DRAWINGS

Further preferred embodiments of the invention will become apparent from the dependent claims and the following description with reference to figures.

In the drawing, which is schematic.

FURTHER DESCRIPTION OF THE INVENTION

Figure 1:
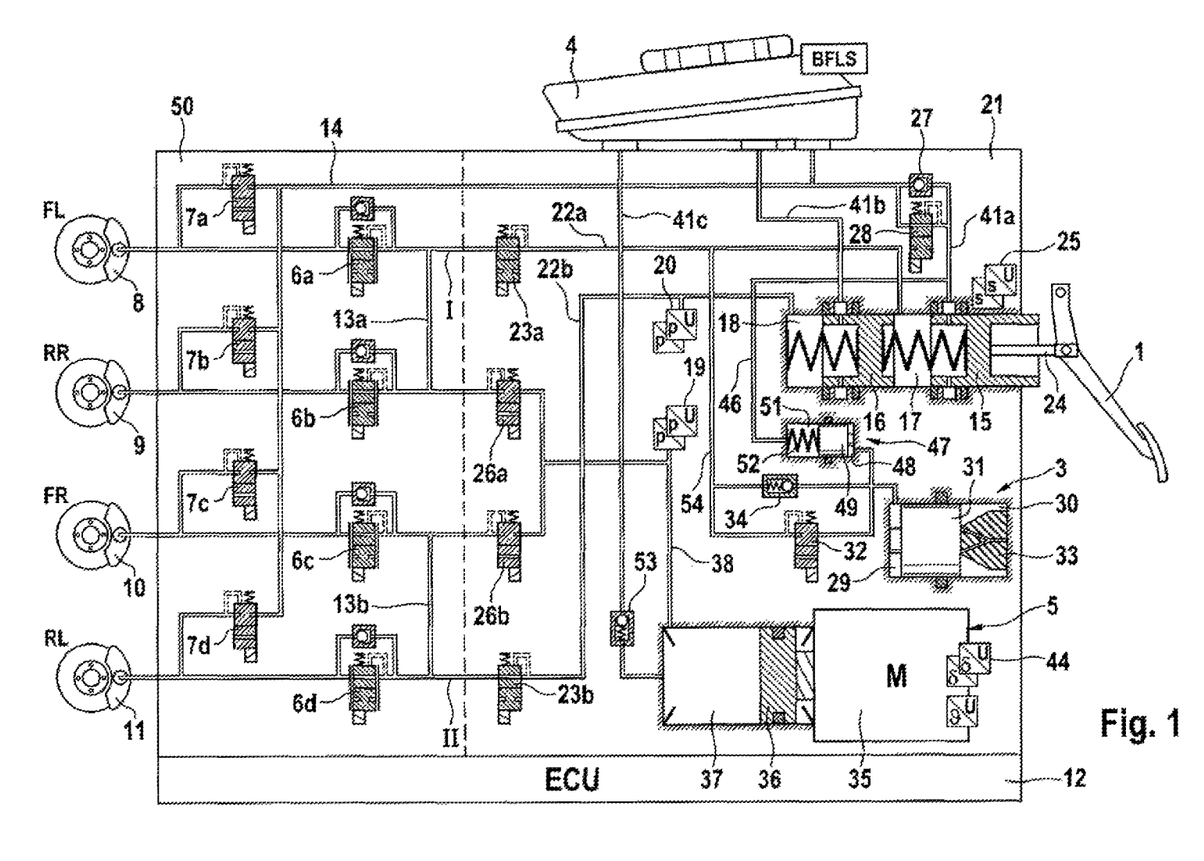
FIG. 1 shows an illustrative embodiment of a braking system according to the invention.

An illustrative embodiment of a braking system according to the invention is shown schematically in FIG. 1. The braking system essentially includes a hydraulic actuating unit 2, which can be actuated by means of an actuating or brake pedal 1, a travel simulator or simulation device 3, which interacts with the hydraulic actuating unit 2, a pressure medium reservoir 4, which is associated with the hydraulic actuating unit 2 and is under atmospheric pressure, an electrically controllable pressure supplying device 5, an electronic open-loop and closed-loop control unit 12 and an electrically controllable pressure modulation device 50.

According to the example, pressure modulation device 50 all-trade-to-dummy includes an inlet valve 6a-6d and an outlet valve 7a-7d for each wheel brake 8, 9, 10, 11 of a motor vehicle (not shown), said valves being hydraulically connected in pairs, via center ports, to one another and to the wheel brakes 8, 9, 10, 11. The inlet ports of the inlet valves 6a-6d are supplied with pressures by means of brake circuit supply lines 13a, 13b, said pressures being derived, in a "brake by wire" operating mode, from a system pressure present in a system pressure line 38 connected to a pressure chamber 37 of the electrically controllable pressure supplying device 5. A check valve (not denoted specifically) opening toward the brake circuit supply lines 13a, 13b is connected in parallel with each of the inlet valves 6a-6d. In an unassisted fallback operating mode, the brake circuit supply lines 13a, 13b are supplied with the pressures from the pressure chambers 17, 18 of the actuating unit 2 via hydraulic lines 22a, 22b. The outlet ports of the outlet valves 7a-7d are connected to the pressure medium reservoir 4 by a return line 14. To detect the pressure prevailing in the system pressure line 38, a pressure sensor 19, preferably embodied in a redundant way, is provided. According to the example, wheel brakes 8 and 9 are associated with the front left-hand wheel and rear right-hand wheel, respectively, and wheel brakes 10 and 11 are associated with the front right-hand wheel and the rear left-hand wheel, respectively. Other circuit divisions are likewise conceivable.

The inlet and outlet valves 6a-6d, 7a-7d and, if appropriate, parts of the brake circuit supply lines 13a, 13b and parts of the return line 14 can be combined into an independent electrohydraulic module and then form the pressure modulation device 50, which is indicated in a highly schematic form by the dashed line in FIG. 1.

In a housing 21, the hydraulic actuating unit 2 has two pistons 15, 16 arranged in series, which delimit hydraulic chambers or pressure chambers 17, 18, said chambers forming a twin-circuit brake master cylinder or a tandem master cylinder together with the pistons 15, 16. On the one hand, the pressure chambers 17, 18 communicate with the pressure medium reservoir 4 via radial bores formed in the pistons 15, 16 and corresponding pressure compensation lines 41a, 41b, wherein said lines can be shut off by a relative movement of the pistons 17, 18 in the housing 21, and, on the other hand, they communicate by means of the hydraulic lines 22a, 22b with the brake circuit supply lines 13a, 13b already mentioned, by which the pressure modulation device 50 is connected to the actuating unit 2. In this case, a normally open (NO) isolation valve 28 is connected in parallel in pressure compensating line 41a with a check valve 27 that closes toward the pressure medium reservoir 4. The pressure chambers 17, 18 accommodate return springs (not denoted specifically), which position the pistons 15, 16 in an initial position when the brake master cylinder 2 is unactuated. A piston rod 24 couples the pivoting motion of the brake pedal 1 due to a pedal actuation to the translational motion of the first (master cylinder) piston 15, the actuating travel of which is detected by a displacement sensor 25, preferably embodied in a redundant way. As a result, the corresponding piston travel signal is a measure of the brake pedal actuation angle. It represents a braking demand by a vehicle driver.

Isolation valve 28, which can also be referred to as a diagnostic valve, can be used to divide the hydraulic connection between pressure chamber 17 and the pressure medium reservoir 4 when the brake pedal 1 is unactuated in order in this way to perform an active brake pressure buildup in the brake master cylinder 2 by means of the pressure supplying device 5, e.g. for leakage monitoring.

Arranged in each of the line segments 22a, 22b connected to the pressure chambers 17, 18 is a block valve 23a, 23b, each of which is designed as an electrically actuated, preferably normally open (NO), 2/2-way valve. By means of the block valves 23a, 23b, the hydraulic connection between the pressure chambers 17, 18 and the brake circuit supply lines 13a, 13b or pressure modulation unit 50 can be shut off. A pressure sensor 20 connected to line segment 22b detects the pressure built up in pressure chamber 18 by a displacement of the second piston 16.

The electrically controllable pressure supplying device 5 is designed as a hydraulic cylinder/piston arrangement or a single-circuit electrohydraulic actuator (linear actuator), the piston 36 of which can be actuated by a schematically indicated electric motor 35 via a likewise schematically illustrated rotation/translation gear. A rotor location sensor indicated only schematically, which is used to detect the rotor location of the electric motor 35, is denoted by reference sign 44. In addition, a temperature sensor can also be used to sense the temperature of the motor winding. The piston 36 delimits a pressure chamber 37.

The actuator pressure produced by the force effect of piston 36 on the pressure medium enclosed in pressure chamber 37 is fed into the system pressure line 38 and detected by means of the system pressure sensor 19. In the "brake by wire" operating mode, the system pressure line 38 is connected to the brake circuit supply lines 13a, 13b via the sequence valves 26a, 26b. It is over this path that a brake pressure buildup and reduction takes place for all the wheel brakes 8, 9, 10, 11 during a normal braking operation. During the pressure reduction, the pressure medium that has previously been displaced out of the pressure chamber 37 of the actuator 5 into the wheel brakes 8, 9, 10, 11 flows back into the pressure chamber 37 of the actuator 5 over the same path. During a braking operation with wheel brake pressures that are controlled with the aid of the modulation valves 6a-6d, 7a-7d and that differ for each wheel, on the other hand, the pressure medium fraction discharged via the outlet valves 7a-7d flows into the pressure medium reservoir 4. It is possible to draw additional pressure medium into pressure chamber 37 by retraction of piston 36 with the sequence valves 26a, 26b closed, since pressure medium can flow out of the reservoir 4, via line 41c containing an anti-cavitation valve 53 designed as a check valve that opens in the direction of flow to the actuator, into the actuator pressure chamber 37.

Simulation device 3 is hydraulically coupled to the brake master cylinder 2 and, for example, is designed as an independent subassembly which consists essentially of a simulator chamber 29, a simulator rear chamber 30 and a simulator piston 31 separating the two chambers 29, 30 from one another. The simulator piston 31 is supported on the housing 21 by an elastic element 33 (e.g. simulator spring) arranged in the simulator rear chamber 30. According to the example, the simulator chamber 29 can be connected by means of an electrically actuated simulator enable valve 32 to the first pressure chamber 17 of the tandem brake master cylinder 2 (via line segment 54). A check valve 34 arranged hydraulically anti-parallel with respect to the simulator enable valve 32 allows a largely unhindered return flow of the pressure medium from the simulator chamber 29 to the pressure chamber 17 of the brake master cylinder, irrespective of the operating state of the simulator enable valve 32.

The simulator chamber 29 of the simulation device 3 is furthermore (operatively) connected by a hydraulic connecting line 46a, in which a media separating device 47 is arranged, to the port of the isolation valve 28 (pressure compensating line 41a) for the brake master cylinder.

According to the example, media separating device 47 is designed as a cylinder/separating piston arrangement 47 which, as a media separating element, has a displaceable piston 49, which is guided in the housing 21 for example and which separates two hydraulic chambers 48, 51 from one another. The first chamber 48 is hydraulically connected to the simulator chamber 29, while the second chamber 51 is hydraulically connected to the isolation valve 28. It is advantageous if an elastic element 52 (e.g. a spring), via which piston 49 is supported on housing 21, is arranged in the second chamber 51. In order to hold the piston in a rest position, the elastic element 52 is preloaded.

As an alternative (or in addition), the media separating device can also be provided in the form of a flexible diaphragm as a media separating element, separating two hydraulic chambers 48, 51 from one another.

When the isolation valve 28 is open in the "brake by wire" operating mode, chamber 48 forms an additional pressure medium receiving volume (in addition to the simulation device 3), the maximum receiving volume of which is limited however (by the (left-hand) "impact" of the piston 49 in the housing 21 or by the maximum extension/deformation of the flexible diaphragm). By means of the media separating device 47, the hydraulic connection between pressure chamber 17 and pressure medium reservoir 4 is interrupted and the displacement of pressure medium out of pressure chamber 17 into the pressure medium reservoir 4 is limited to a volume corresponding to the volume of the first chamber 48. If the isolation valve 28 is leaky, only the limited volume of the media separating device 47 can escape into the pressure medium reservoir 4.

In the normal braking function of the braking system ("brake by wire" operating mode), the brake master cylinder 2 and hence the vehicle driver are decoupled from the wheel brakes 8, 9, 10, 11 by the closed block valves 23a, 23b, and the brake circuit supply lines 13a, 13b are connected via the opened sequence valves 26a, 26b to the pressure supplying device 5, which supplies the system pressure for actuating the wheel brakes 8, 9, 10, 11. The simulation device 3 is connected by the opened simulator enable valve 32, with the result that the pressure medium volume displaced in the brake master cylinder 2 by the actuation of the brake pedal 1 by the driver is received by the simulation device 3, and the simulation device 3 gives the vehicle driver a familiar brake pedal feel.

In a fallback operating mode of the braking system, e.g. in the event of a failure of the electric energy supply of the entire braking system, the simulation device 3 is disconnected by the normally closed simulator enable valve 32, and the pressure supplying device 5 is separated from the brake circuit supply lines 13a, 13b by the normally closed sequence valves 26a, 26b. The brake master cylinder 2 is connected by lines 22a, 22b to the normally open block valves 23a, 23b by the brake circuit supply lines 13a, 13b and hence to the wheel brakes 8, 9, 10, 11, with the result that the vehicle driver can build up pressure directly in the wheel brakes 8, 9, 10, 11 by actuating the brake pedal 1.

The electronic open-loop and closed-loop control unit 12 is used to control the electrically actuated components of the braking system, in particular the valves 23a, 23b, 26a, 26b, 28, 32 and the electric motor 35 of the pressure supplying device 5. Open-loop and closed-loop control unit 12 is also designed to control the pressure modulation device 50. The signals from the sensors 19, 20, 25 and 44 are likewise processed in the electronic open-loop and closed-loop unit 12.

In general, in the braking system in FIG. 1, if connection 46 is initially left out of account, the brake pedal feel perceptible to the driver is obtained from the static and dynamic characteristics of the mechanically preset pedal force/pedal travel characteristic curve and the static and dynamic characteristics of the predeterminable pedal travel/deceleration characteristic curve in the "brake by wire" operating mode. The pedal force/pedal travel characteristic curve is substantially determined by the stiffness of the elastic element 33 of the simulation device 3 and by the sum of all frictional and restriction effects. The pedal travel/deceleration characteristic curve is substantially determined by a function which can be specified in the electronic open-loop and closed-loop control unit 12 and which represents the relationship between the brake pedal actuation input by the vehicle driver (represented by the brake pedal travel or brake pedal angle or travel of the piston 15) and the setpoint system pressure to be established by the pressure supplying device 5. As an option, additional variables can also be used to determine the setpoint system pressure, e.g. the speed of actuation of the brake pedal or the pressure in the brake master cylinder 2.

In principle, various, in particular switchable, brake pedal feel presets (e.g. a "sport" or a "comfort" setting) can be formed by adjusting the pedal travel/deceleration characteristic curve, which is easy to implement in the software. In this case, however, it is generally possible to match only one of the settings of the pedal travel/deceleration characteristic curve correctly with the preset pedal force/pedal travel characteristic curve. If matching is performed for a first pedal travel/deceleration characteristic curve (e.g. the "comfort" pedal travel/deceleration characteristic curve) for example, the second pedal travel/deceleration characteristic curve (e.g. the "sport" pedal travel/deceleration characteristic curve) is achieved through a higher setpoint deceleration with shorter brake pedal travels. However, the higher deceleration then fails to match the pedal force since, in this case, a higher reaction force is expected by the vehicle driver.

The braking system according to the invention and the method according to the invention offer the advantage of an additional adjustment or change of the pedal force/pedal travel characteristic curve, thus making it possible to match the second pedal force/pedal travel characteristic curve in an appropriately harmonious way with the second pedal travel/deceleration characteristic curve. At the same time, the invention does not require any additional actuators.

Figure 3:
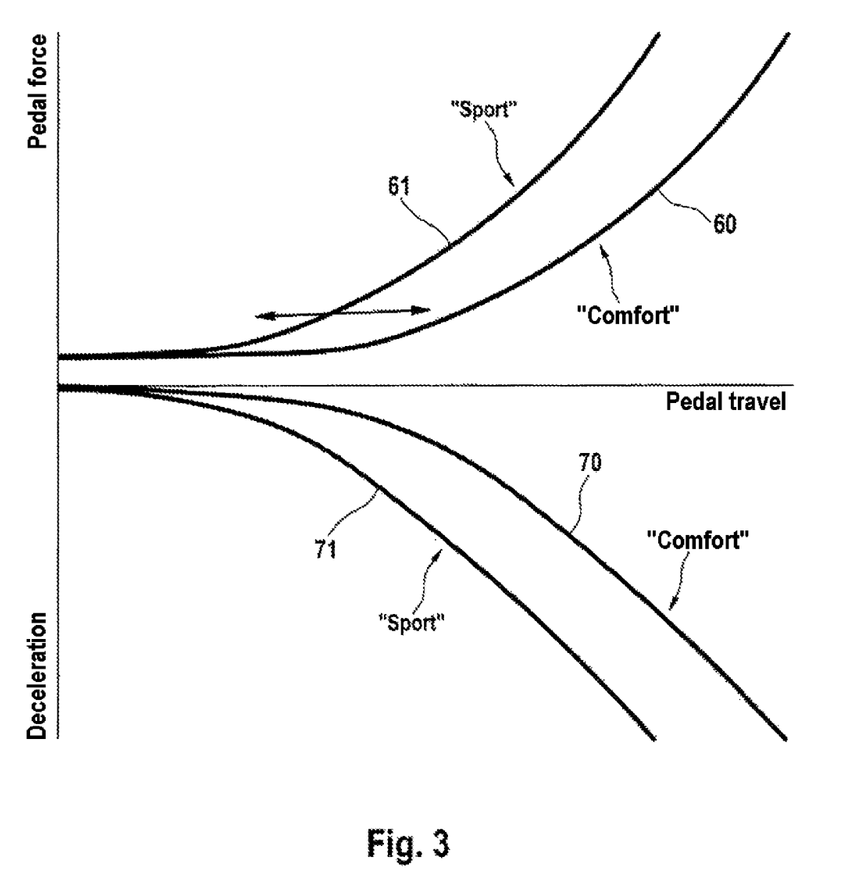
FIG. 3 shows illustrative characteristic curves designed to illustrate various brake pedal feels.

Illustrative characteristic curves intended to represent two brake pedal feel presets, a "sport" setting and a "comfort" setting, are shown in FIG. 3. The pedal travel or a corresponding variable (e.g. the travel of the piston 15) is plotted on the x axis. The pedal force is plotted on the y axis in the upper part of FIG. 3, and the upper part of FIG. 3 accordingly shows the pedal force/pedal travel characteristic curve 60 for the "comfort" setting and the pedal force/pedal travel characteristic curve 61 for the "sport" setting. A switch between the two pedal force/pedal travel characteristic curves is performed by means of the isolation valve 28, as is explained in greater detail below. The vehicle deceleration is plotted on the y axis in the lower part of FIG. 3, and the pedal travel/deceleration characteristic curve 70 for the "comfort" setting and the pedal travel/deceleration characteristic curve 71 for the "sport" setting are shown accordingly. Functions, corresponding to the pedal travel/deceleration characteristic curves, for determining the setpoint system pressure as a function of the pedal travel stored in the electronic open-loop and closed-loop control unit 12, for example.

Fundamentally, electromechanical adjustment of the pedal force/pedal travel characteristic curve would be conceivable, but this is associated with considerable additional costs because of the additional actuators.

A switchable pedal force/pedal travel characteristic curve in the "brake by wire" operating mode, i.e. when the simulator enable valve 32 is open, is preferably achieved by using the isolation valve 28 available for the diagnostic capability of the braking system.

The media separating device 47, in particular the pressure medium receiving volume thereof in chamber 48 and the elastic element 52 as well as the simulation device 3, in particular the elastic element 33 thereof, are preferably designed in such a way that they simulate or represent the "comfort" setting when the isolation valve 28 is open. Switching of the isolation valve 28 is then unnecessary in the "comfort" setting, which generally represents the default setting. When the brake pedal 1 is actuated, the simulator enable valve 32 is opened, with the result that when the isolation valve 28 is open, a limited volume of pressure medium is initially displaced into the first chamber 48 and then also into the simulator chamber 29. When the brake pedal 1 is actuated, therefore, the isolation valve 28 is then not closed during the entire braking operation in the "comfort" setting.

If a different brake pedal feel with a shortened brake pedal travel is desired, e.g. the "sport" setting or indeed a setting between the "comfort" setting and the "sport" setting, the isolation valve is closed, e.g. directly at the start of brake pedal actuation or, alternatively, with a time delay, with the result that only the simulation device 3 receives pressure medium. In the "sport" setting, the isolation valve 28 is closed immediately when the brake pedal is actuated, for example, and advantageously remains closed during the entire braking operation.

The isolation valve 28 for shortening the pedal travel is preferably switched in accordance with the setting of a selector switch or the choice made by the vehicle driver via an HMI interface (e.g. first option "comfort", second option "sport").

To shorten the pedal travel, the isolation valve 28 is alternatively or additionally switched in accordance with one or more variables relating to vehicle dynamics, e.g. the driving speed, the speed of pedal actuation, and/or other signals (e.g. pedestrian protection/hazard braking initiation). For example, the isolation valve 28 can be switched in accordance with a signal from an open-loop and/or closed-loop control unit in the motor vehicle, in which hazard detection is performed, with the result that the isolation valve 28 is closed to shorten the brake pedal travel when the brake pedal is actuated and hazard braking is detected.

Figure 2:
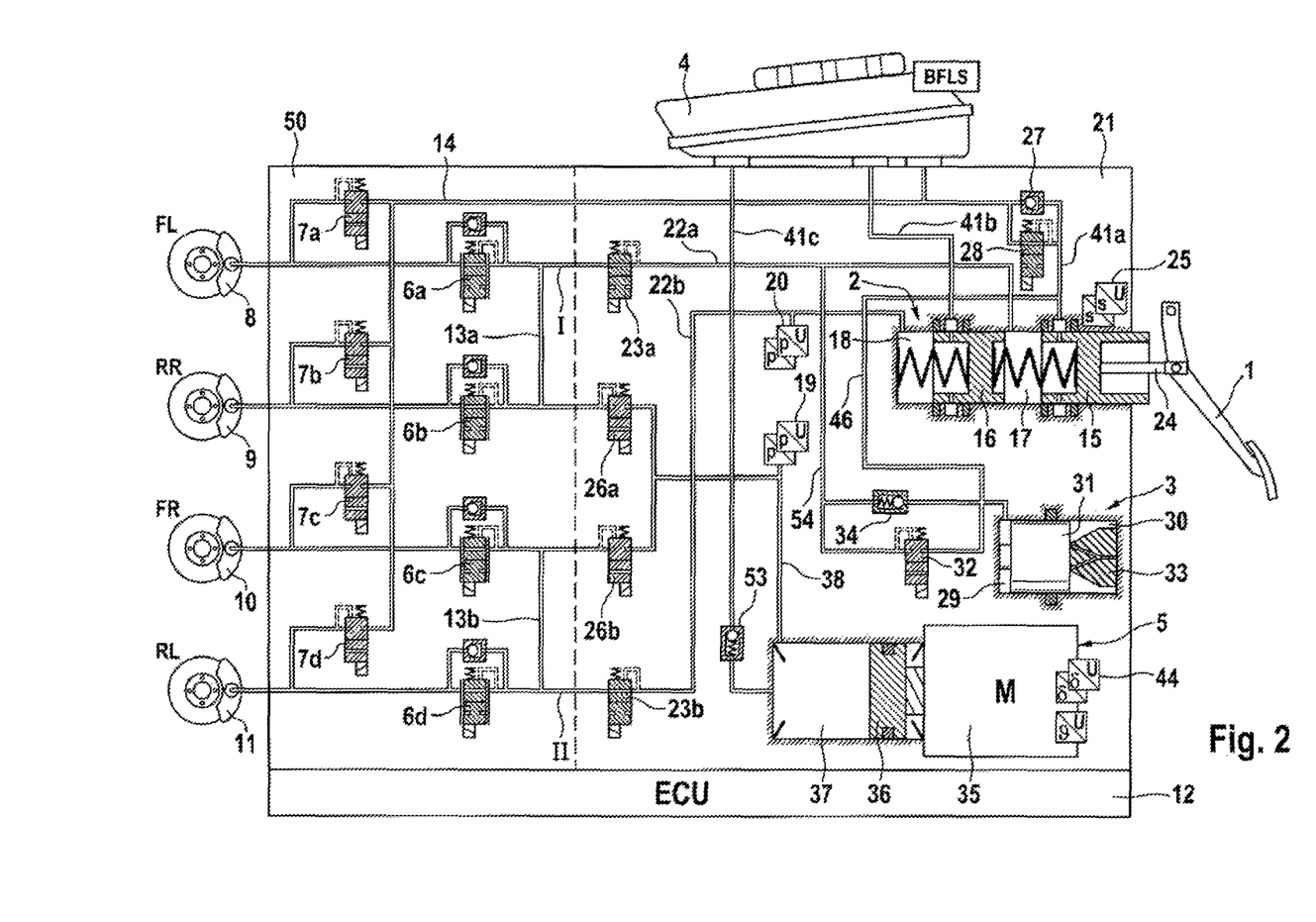
FIG. 2 shows a braking system.

An alternative braking system is shown schematically in FIG. 2. The second illustrative embodiment corresponds to the first illustrative embodiment without the media separating device 47, i.e. there is a hydraulic connection between pressure chamber 17 and the pressure medium reservoir 4 when the isolation valve 28 is open in the "brake by wire" operating mode.

In the braking system, the characteristic curve of the simulator spring 33 exhibits a small initial volume take-up (first pedal force/pedal travel characteristic curve), which corresponds to a "sport" setting, for example. This comes into effect by immediate closure of the isolation valve 28 in the event of a brake pedal actuation, the isolation valve being hydraulically connected on the inlet side to the simulator chamber 29 by the connecting line 46.

If the pedal-travel-controlled closure of the isolation valve 28 is later, a "comfort" setting is obtained since, as long as the isolation valve 28 is open, pressure medium volume is initially displaced via the isolation valve 28 into the reservoir 4 and hence a longer, shallow progression is imparted to the characteristic curve (second pedal force/pedal travel characteristic curve) in the initial range.

The disadvantage with the braking system in FIG. 2 is that switching (closure) of the isolation valve 28 is also necessary for the "comfort" setting in order to avoid "losing" too much pressure medium, and this can be acoustically troublesome for the vehicle driver. Moreover, the vehicle driver would displace pressure medium from the brake master cylinder 2 into the reservoir 4 without any counterforce if the isolation valve 28 were leaky. This fault should be avoided at all costs for reasons of safety.

While the above description constitutes the preferred embodiment of the present invention, it will be appreciated that the invention is susceptible to modification, variation and change without departing from the proper scope and fair meaning of the accompanying claims.

The invention claimed is:

1. A braking system for motor vehicles using a pressure medium applied to one or more wheel brakes and which, in a brake by wire operating mode, can be controlled both by a vehicle driver and independently of the vehicle driver, and is preferably operated in the brake by wire operating mode and can be operated in at least one fallback operating mode, comprising:
 a brake master cylinder, which can be actuated by a brake pedal and having at least one piston and at least one pressure chamber, to which can be connected to a brake circuit and the wheel brakes,
 an electrically controllable pressure supplying device for actuating the wheel brakes in the brake by wire operating mode,
 a simulation device having at least one elastic element, which provides an acceptable brake pedal feel to the vehicle driver in the brake by wire operating mode, wherein the simulation device has a hydraulic simulator chamber, which is hydraulically connected, via a first hydraulic connection to the pressure chamber of the brake master cylinder and which is further communication through a connection with an electrically actuated isolation valve with a pressure medium reservoir under atmospheric pressure, and
 a media separating device arranged in the connection between the simulator chamber and the isolation valve, wherein the media separating device does not allow fluid to flow through the media separation device from one side to the other.

2. The braking system as claimed in claim 1, in that the media separating device further comprises a first hydraulic chamber for receiving the pressure medium, which is separated from a second hydraulic chamber by a media separating element that can be moved or deformed to a limited extent, wherein the second hydraulic chamber is hydraulically connected to the isolation valve.

3. A braking system for motor vehicles using a pressure medium applied to one or more wheel brakes and which, in a brake by wire operating mode, can be controlled both by a vehicle driver and independently of the vehicle driver, and is preferably operated in the brake by wire operating mode and can be operated in at least one fallback operating mode, comprising:
 a brake master cylinder, which can be actuated by a brake pedal and having at least one piston and at least one pressure chamber, to which can be connected to a brake circuit and the wheel brakes,
 an electrically controllable pressure supplying device for actuating the wheel brakes in the brake by wire operating mode,
 a simulation device having at least one elastic element, which provides an acceptable brake pedal feel to the vehicle driver in the brake by wire operating mode, wherein the simulation device has a hydraulic simulator chamber, which is hydraulically connected, via a first hydraulic connection to the pressure chamber of the brake master cylinder and which is further communication through a connection with an electrically actuated isolation valve with a pressure medium reservoir under atmospheric pressure, and
 a media separating device arranged in the connection between the simulator chamber and the isolation valve, wherein the media separating device further comprises a first hydraulic chamber for receiving the pressure medium, which is separated from a second hydraulic chamber by a media separating element that can be moved or deformed to a limited extent, wherein the second hydraulic chamber is hydraulically connected to the isolation valve,
 wherein the first hydraulic chamber is hydraulically connected to the simulator chamber and is in hydraulic communication with the pressure chamber.

4. The braking system as claimed in claim 2 further comprising in that the media separating device is embodied as a cylinder and piston arrangement, wherein the media separating element is a separating piston.

5. The braking system as claimed in claim 4, further comprising a preloaded elastic element, on which the separating piston is supported, is arranged in the second hydraulic chamber.

6. The braking system as claimed in claim 2 in that the media separating element, comprises a flexible diaphragm.

7. The braking system as claimed in claim 1 further comprising in that the isolation valve is arranged in a second hydraulic connection between the pressure chamber and the pressure medium reservoir.

8. The braking system as claimed in claim 7, further comprising in that the hydraulic simulator chamber is in communication with the second hydraulic connection between the pressure chamber and the isolation valve.

9. The braking system as claimed in claim 1 further comprising in that the first hydraulic connection is opened and closed by an electrically actuated simulator enable valve.

10. A method for the operation of a braking system of a brake by wire type of a vehicle comprising the steps of,
 providing a brake master cylinder, which can be actuated by means of a brake pedal and has at least one pressure chamber, communicating with a brake circuit for actuating wheel brakes,
 providing an electrically controllable pressure supplying device for actuating the wheel brakes,
 providing a simulation device, which provides an acceptable brake pedal feel to a driver of the vehicle in the brake by wire operating mode,
 providing the simulation device having a hydraulic simulator chamber, which is in hydraulic communication with the pressure chamber in the brake master cylinder and which is in communication by an electrically actuated isolation valve with a pressure medium reservoir under atmospheric pressure, in which a pressure medium is displaced into the pressure medium reservoir via the isolation valve in order to modify a force/displacement characteristic curve of a brake pedal actuation,
 limiting the quantity of the pressure medium displaced into the pressure medium reservoir to a predetermined maximum quantity by a media separating device arranged between the simulator chamber and the isolation valve, when the isolation valve is open, wherein the media separating device does not allow fluid to flow through the media separation device from one side to the other.

11. The method as claimed in claim 10, further comprising the step of in that, when a predetermined condition is present, and when a first option has been chosen by the vehicle driver via an HMI interface, the isolation valve is not closed during operating the braking system when the brake pedal is actuated.

12. The method as claimed in claim 10 further comprising in that, when a predetermined condition is present, and when a second option has been chosen by the vehicle driver via an HMI interface, the isolation valve is closed when the brake pedal is actuated, and, remains closed during operating the braking system when the brake pedal is actuated.

13. The method as claimed in claim 10 further comprising in that, when the brake pedal is actuated, the isolation valve is closed to shorten the brake pedal travel in accordance with at least one of a choice of the vehicle driver via an HMI interface, in accordance with a variable relating to driving dynamics, in accordance with a signal from an open-loop, and a closed-loop control unit in the motor vehicle in which unit hazard detection is performed.

14. The braking system as described in the claim 1 further comprising wherein the simulation device and the media separating device operate together to provide the acceptable brake pedal feel.

15. The braking system as described in the claim 1 further comprising wherein the simulation device and the media separating device operate in a first mode to provide the acceptable brake pedal feel, and in a second mode in which only the simulation device is operable to provide the acceptable brake pedal feel.

16. The braking system as described in claim 1 further comprising an electronic control unit for operating the braking system in a first and a second mode, wherein in the first mode the isolation valve is open during operation of the braking system when the brake pedal is actuated, and in a second mode in which the isolation valve is closed during the operation of the braking system when the brake pedal is actuated, and wherein the first and second modes provide differing levels of the acceptable brake pedal feel to the vehicle driver.

17. The braking system as described in claim 16 further comprising an input enabling the vehicle driver to select between the first and the second modes.

18. The braking system as described in claim 16 further comprising the electronic control unit selecting between the first and the second modes based upon the one or more of; a choice by the vehicle driver, a variable relating to driving dynamics of the vehicle, and a signal from the control unit.

19. A braking system for motor vehicles using a pressure medium applied to one or more wheel brakes and which, in a brake by wire operating mode, can be controlled both by a vehicle driver and independently of the vehicle driver, and is preferably operated in the brake by wire operating mode and can be operated in at least one fallback operating mode, comprising:

a brake master cylinder, which can be actuated by a brake pedal and having at least one piston and at least one pressure chamber, to which can be connected to a brake circuit and the wheel brakes, an electrically controllable pressure supplying device for actuating the wheel brakes in the brake by wire operating mode, a simulation device having at least one elastic element, which provides an acceptable brake pedal feel to the vehicle driver in the brake by wire operating mode, wherein the simulation device has a hydraulic simulator chamber, which is hydraulically connected, via a first hydraulic connection to the pressure chamber of the brake master cylinder and which is further communication through a connection with an electrically actuated isolation valve with a pressure medium reservoir under atmospheric pressure, a media separating device arranged in the connection between the simulator chamber and the isolation valve, and an electronic control unit for operating the braking system in a first and a second mode, wherein in the first mode the isolation valve is open during operation of the braking system when the brake pedal is actuated, and in a second mode in which the isolation valve is closed during the operation of the braking system when the brake pedal is actuated, and wherein the first and second modes provide differing levels of the acceptable brake pedal feel to the vehicle driver, wherein the first mode corresponds with a comfort mode and the second mode corresponds with a sport mode, wherein the sport modes provides a greater brake force to pedal travel gradient than in the comfort mode.

20. The method of claim 10, wherein the media separating device further comprises a first hydraulic chamber for receiving the pressure medium, which is separated from a second hydraulic chamber by a media separating element that can be moved or deformed to a limited extent, wherein the second hydraulic chamber is hydraulically connected to the isolation valve, wherein the first hydraulic chamber is hydraulically connected to the simulator chamber and is in hydraulic communication with the pressure chamber.

21. The method of claim 10 further comprising providing an electronic control unit for operating the braking system in a first and a second mode, wherein in the first mode the isolation valve is open during operation of the braking system when the brake pedal is actuated, and in a second mode in which the isolation valve is closed during the operation of the braking system when the brake pedal is actuated, and wherein the first and second modes provide differing levels of the acceptable brake pedal feel to the vehicle driver, wherein the first mode corresponds with a comfort mode and the second mode corresponds with a sport mode, wherein the sport modes provides a greater brake force to pedal travel gradient than in the comfort mode.

* * * * *